Oct. 30, 1951 B. J. MILLER ET AL 2,573,349
SUBSCRIBER SIGNALING SYSTEM
Filed Dec. 9, 1949
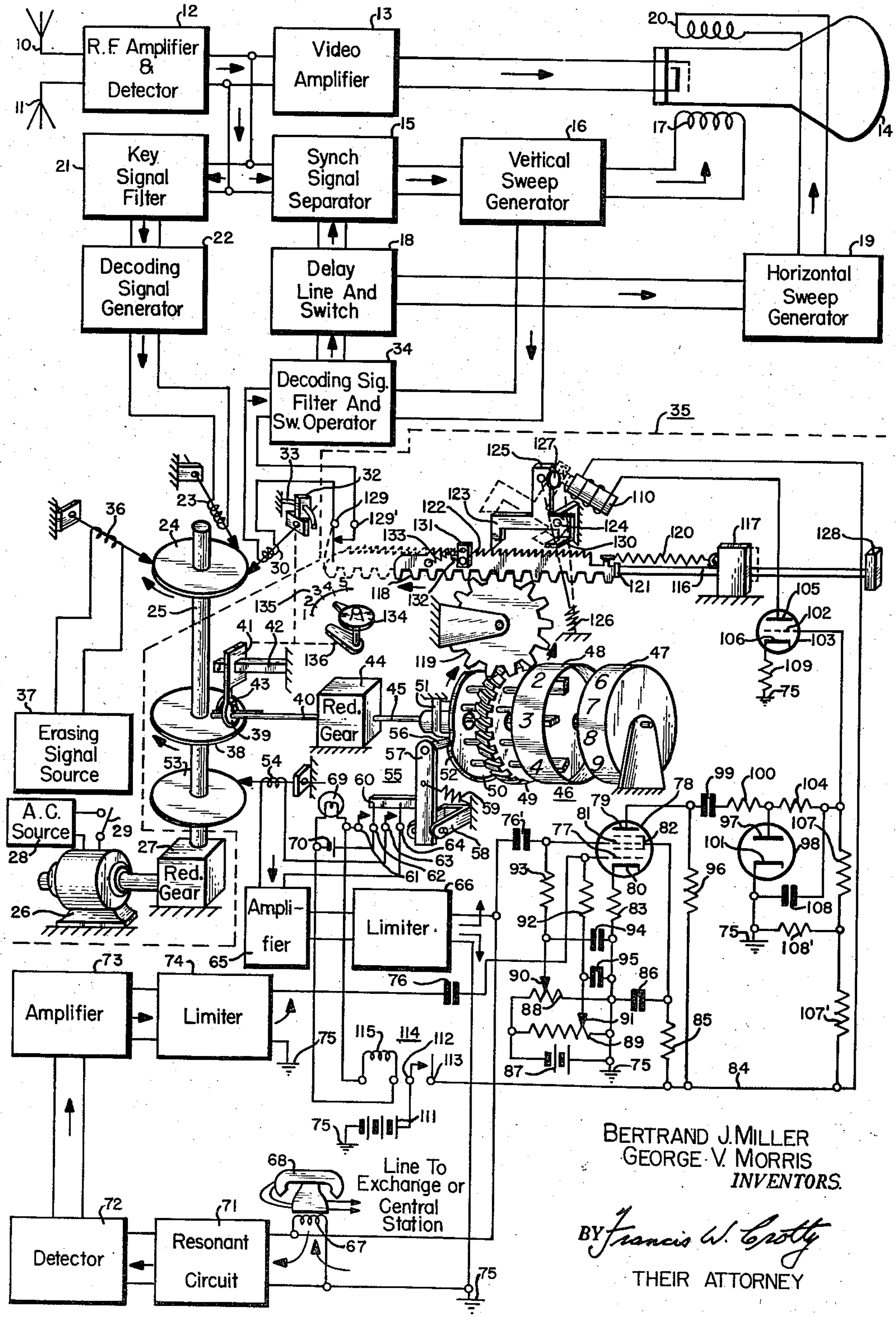
BERTRAND J. MILLER
GEORGE V. MORRIS
*INVENTORS.*
BY Francis W. Crotty
THEIR ATTORNEY Patented Oct. 30, 1951

2,573,349

UNITED STATES PATENT OFFICE 2,573,349

SUBSCRIBER SIGNALING SYSTEM

Bertrand J. Miller, Oak Park, and George V. Morris, Melrose Park, Ill., assignors to Zenith Radio Corporation, a corporation of Illinois Application December 9, 1949, Serial No. 132,174

7 Claims. (Cl. 177—353)

This invention relates to a subscriber type signalling system in which an electrical signal is radiated in coded form for reproduction solely by subscriber receivers upon the receipt of a suitable key signal. More particularly, the invention concerns a subscription program metering system for a subscriber type television receiver.

Copending application Serial Number 81,552, filed March 15, 1949 for a Subscriber Signalling System in the names of George V. Morris and Bertrand J. Miller, now abandoned, discloses a subscription system in which a television signal is radiated to subscriber receivers in coded form and a key signal, necessary to decode the coded television signal, is transmitted to the subscriber receivers concomitantly with the coded signal by the same radiated carrier means. In the system there described a recorder is coupled to an element of the receiver which is operable during subscription programs. The recorder is adapted to integrate the time intervals during which the receiver element is operated. From time to time the recorder may be read to determine the periodic charges to be made to the subscriber. In such a system of recording in order to effect customer charges, some person in the capacity of a meter reader must make periodic visits to the locale of each subscriber receiver.

It is an object of this invention to provide, in a subscription type receiver, a metering system which obviates the need for personal visits to the locale of subscription receivers by a meter reader.

It is a further object of this invention to provide, in a subscription type television receiver, a subscription program metering system for effecting subscriber charges via a line circuit.

In accordance with the invention, the subscription program metering system is included in a subscription type television receiver having a component element operable during the reception of subscription programs. The metering system effects subscriber charges via a line circuit over which a reset signal is transmitted from a central station in response to a subscriber identification signal. The system is comprised of an integrator, coupled to the afore-mentioned receiver element, and driven in an additive direction thereby, to integrate the time intervals during which the element is operated. A generator is provided for producing a subscriber identification signal and a switch actuated by the integrator selectively couples the generator with the line circuit to establish thereon transmission of the identification signal at a predetermined time summation of the integrator. The system further includes a resetting driver coupled with the integrator to drive the integrator in a subtractive direction for a preselected time value in response to a control potential. Means, responsive to at least the reset signal, are included to develop a control potential for actuating the resetting driver.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which the single figure shows, schematically and partly in block form, a complete television receiver of the subscription type including a metering system embodying the present invention with certain elements thereof shown in perspective.

Referring to the drawing, the subscriber receiver there shown comprises an antenna-ground circuit 10, 11 coupled to a unit 12 which includes one or more stages of R. F. amplification and a detector. Unit 12 may also include conventional converter and intermediate frequency amplification stages interposed between the R. F. amplifier and the detector. The output terminals of unit 12 are connected to a video amplifier 13 of any desired number of stages, in turn, coupled to the control electrode and cathode of a receiver image reproducing device 14. The output terminals of unit 12 are also connected to a synchronizing signal separator 15 which is connected to a vertical sweep generator 16, in turn, coupled with vertical deflection coils 17 of reproducing device 14. Synchronizing signal separator 15 is also connected, through a delay line and switch 18, to a horizontal sweep generator 19, in turn, coupled with horizontal deflection coils 20 of device 14. The unit 12 is further connected to a key signal filter 21, the output terminals of which are connected with a decoding signal generator 22.

Generator 22 is coupled to a magnetic recording head 23 associated with a disc 24 of magnetic material which is supported for rotation with a shaft 25. A synchronous motor 26 rotatably drives shaft 25 through a reduction gear 27, and is connected to an alternating current source 28 through a switch 29.

A magnetic pickup head 30, associated with disc 24, is supported for concentric movement relative to disc 24 by a carriage member 32 slidably disposed on an arcuate bar 33. Pickup head 30 is coupled to a decoding signal filter and switch operator 34 through switch means within the metering system 35, embodying the present invention, as will be pointed out more fully hereinafter. An erasing head 36 is associated with disc 24 and an erasing signal source 37 is coupled with head 36. Head 36 is positioned relative to the other heads so that upon rotation of the disc 24, a given point thereon passes recorder 23, reproducer 30 and eraser 36 in the named order.

Stage 34 is coupled with delay line and switch 18 and the synchronizing signal separator 15 also is connected with delay line and switch 18. Further, vertical sweep generator 16 is coupled with stage 34.

The metering system of the present invention is coupled with shaft 25 and meters the movement of this shaft and disc 24 as will be more fully explained hereinafter.

Neglecting for the moment the operation of the metering system 35 the circuit above-described comprises, in general, a subscriber type television receiver which includes a component element represented by disc 24 operable during the reception of subscription programs. For a discussion of the operation of such a receiver reference is made to the afore-mentioned Morris et al. application; however, a brief description thereof now follows.

The receiver is responsive to a subscription television receiver of the type described in the Morris et al. application in which the television signal is coded to appear in two modes. In a first mode, the video signal components of the composite television signal have a certain time relation with respect to the synchronizing signal components and in a second mode the video signal components have an altered time relation with respect to the synchronizing signal components. Specifically, in the second mode the video components are delayed a small amount with respect to the synchronizing components. Bursts of coding or key signal at a particular frequency are transmitted with the composite television signal and are representative of one of the two modes of transmission. Thus, at a subscription receiver the key signal may be selectively removed from the composite signal by means of a selective filter network and utilized to compensate the variation in timing of the video and synchronizing signal components to afford proper decoding of the coded signal. In order that information regarding program charging rates be supplied to subscriber receivers, there is provided, at the transmitter (not shown), means for selectively timing the key signal components relative to the composite coded television signal to indicate the rate of charge. In other words, a signal is transmitted having the coded television signal and the key signal time displaced from one another by a selected time interval indicative of the charging rate and in a subscriber receiver a corresponding time interval must be interposed for decoding.

A subscription television signal of the type just described may be received by antenna ground circuit 10, 11 and amplified in unit 12. The detected, coded signal is amplified in the video amplifier 13 and impressed on reproducing device 14 in the usual manner to provide intensity modulation of the electron beam thereof. The synchronizing signal components of the received signal are separated therefrom in the synchronizing signal separator 15 and synchronizing pulses are impressed upon vertical sweep generator 16 to synchronize the sweep produced by coil 17 of the device 14. Similarly, horizontal synchronizing pulses from the separator 15 are impressed on the horizontal sweep generator 19 through the delay line and switch 18 to synchronize the horizontal sweep produced by deflection coil 20 of device 14. The delay line and switch stage 18 is actuated at appropriate spaced time intervals according to the change in timing from one mode to the other of the video signal components of the received television signal. Such actuation of the delay line and switch 18 acts to delay the timing of the horizontal sweep of device 14 during spaced time intervals an amount identical to the delay in the video signal component during these intervals. Thus, the video signal delay is compensated and the device 14 reproduces correctly the image represented by the received television signal.

The actuation of the delay line and switch 18 by operator 34 is caused to occur at appropriate times by the key signal carried on the radiated television signal. This key signal is removed from the television signal by the filter 21 and controls the decoding signal generator 22. Bursts of decoding signal thereby are obtained from generator 22, which occur at the same instant that a corresponding burst of coding signal occurs at the transmitter (not shown). These bursts of decoding signal from generator 22 are recorded magnetically on disc 24 by means of recording head 23. Such recording may be effected when motor 26 is connected with A. C. source 28 to produce rotation of shaft 25 and disc 24.

The bursts of decoding signal are picked up from the disc by means of pickup head 30 a predetermined time interval later than recorded, depending upon the displacement of head 30 from head 23 along the periphery of disc 24 and the rotational speed of the disc, which always is constant. The decoding signal bursts then are impressed on the filter of stage 34 where they act jointly with vertical blanking pulses from vertical sweep generator 16 to actuate the delay line and switch 18 during the same spaced intervals that the coded signal shifts from one mode of transmission to the other. Thus unit 18, under the control of unit 34, either transmits the synchronizing components from separator 15 to generator 19 with no delay or introduces a delay to such components corresponding to the delay of the video with respect to the synchronizing information characteristic of one of the two modes of transmission. In this manner, the timing of the horizontal sweep of the receiver image reproducing device 14 is altered during the spaced time intervals when the timing of the video signal components of the received television signal are altered, and the device 14 correctly reproduces the image represented by the television signal. The decoding signal is erased from disc 24 when that portion of the disc having it recorded thereon passes erasing head 36.

Referring now to that portion of the figure which includes the metering system 35 embodying the invention, there is shown a disc 38 supported for rotation with shaft 25. An idler wheel 39 is frictionally coupled with one of the planar surfaces of disc 38 and is keyed for rotational movement with a shaft 40 which is perpendicular to shaft 25. Idler 39 is arranged to be slideably displaceable along shaft 40. A carriage member 41 is supported for longitudinal movement relative to a bar 42 disposed parallel to shaft 40, and includes a forked portion 43 positioned to engage and displace idler 39 along shaft 40, upon movement of the carriage. This provides a variable speed drive between disc 38 and idler gear 39. Shaft 40 is mechanically coupled through a reduction gear 44 to a shaft 45, in turn, coupled with an integrator 46 of the decade counter type. Thus, element or disc 24 of the receiver is coupled through shaft 25, disc 38, idler 39, shaft 40, reduction gear 44 and shaft 45 with integrator 46.

Integrator 46 includes a plurality of rotatably movable decade-stepped indicator elements or wheels. In this example, a units element 47 and a tens element 48 are shown although it is to be understood that any number of elements may be included. Units element 47 includes 10 digits and is supported directly for rotation with shaft 45. Tens element 48 includes the digits 0 to 5, inclusive, equally spaced thereon and is mechanically coupled with a gear 49 and a generally disc-shaped cam 50 all of which are journaled for rotation in a bearing 51. The integrator just described, may be of any well known type, in particular the one here illustrated is of the type wherein the tens element 48 is displaced by a single digit only when units element 47 makes a complete rotation, there being no intermediate positions (between digits) for element 48. The operative details for counter 47, 48 are generally well understood and thus such are not shown or described.

Cam 50 includes a cam follower actuating surface 52 disposed along the annular surface thereof at a preselected position relative to indicator element 48. This position corresponds to a predetermined time summation of integrator 46 and, in this example is the summation 40. It should be noted that the total time unit summation of integrator 46 is 50, for this illustration, although any other suitable calibration may be employed. The integrator is arranged to be driven in an additive direction with rotation of element 24 of the receiver to integrate the time interval during which element 24 is operated.

A second disc of magnetic material 53 is supported for rotation with shaft 25 and has magnetically recorded thereon a subscriber identification signal. The disc 53 in combination with a magnetic pickup head 54 constitutes a generator for producing a subscriber identification signal.

A cam switch 55 includes a cam follower 56 supported for engagement with cam 50 to be actuated by surface 52 of the cam. The cam follower portion 56 of switch 55 is supported at one extremity of a lever 57 pivotally supported at the other end thereof in a bearing 58. A spring 59 biases lever 57 so that cam follower 56 engages the annular surface of cam 50. An extension 60 of lever 57 is in incipient engagement with the movable contacts of a pair of normally open single-pole single-throw contactors 61, 62 and 63, 64. Switch 55 is so arranged that when cam 50 is rotated to a position in which actuating surface 52 displaces cam follower 56 both pairs of contactors complete circuit connections.

The reproducing head 54 of the subscriber identification signal generator is coupled to the input terminals of an amplifier 65 through contacts 63 and 64. Amplifier 65 is coupled with an amplitude limiter 66, the output terminals of which are coupled with an induction coil 67 magnetically coupled with a telephone instrument 68, in turn, connected with a line to a telephone exchange or central station (not shown). Thus, when switch 55 is actuated by surface 52 of cam 50 in response to movement of integrator 46 the subscriber identification signal generator 53, 54 is selectively coupled to the line circuit to establish on the line transmission of the identification signal at a predetermined time summation of the integrator. The other pair of contacts 61 and 62 of switch 55 are connected in a series circuit including a warning light 69 and a battery 70 in a manner such that when switch 55 is actuated, battery 70 is connected to warning light 69.

Induction coil 67 is connected with a resonant circuit 71 adapted to be selective only to reset signals of a predetermined frequency transmitted on the line from the central station. The resonant circuit 71 is coupled with a detector 72, in turn, coupled with an amplifier 73, the output terminals of which are coupled to an amplitude limiter 74.

One output terminal of limiter 74 is connected to a ground return 75, and the other output terminal is connected through a coupling condenser 76 with a control electrode 77 of an electron-discharge device 78 having an anode 79, a cathode 80, a second control electrode 81 and a shield electrode 82 for electrode 81. One output terminal of limiter 66 is connected to ground 75 and the other terminal is coupled to the second control grid 81 through a coupling condenser 76'. Cathode 80 is returned to ground through a resistor 83 and shield electrode 82 is connected to a B supply bus 84 through a dropping resistor 85, and is bypassed to ground by a capacitor 86.

The positive terminal of a bias supply source 87 is connected to ground 75 and a pair of potentiometer resistors 88 and 89 are connected in parallel with source 87. Respective, variable taps 90 and 91 are provided for resistors 88 and 89. Control grid 77 is connected to tap 91 through a resistor 92 and the second control grid 81 is connected to tap 90 through a resistor 93. Each of taps 90 and 91 is bypassed to ground 75 by respective ones of bypass condensers 94 and 95. Anode 79 is connected with B supply bus 84 through an output load resistor 96. Tube 78 which, as pointed out, is coupled with the identification signal generator and the line circuit is a comparing circuit for comparing the identification and reset signals.

The anode 79 of tube 78 is coupled to anode 97 of a unidirectionally conductive device 98 here shown as a diode rectifier, through the series combination of a condenser 99 and a resistor 100. Rectifier 98 further includes a cathode 101 connected to ground 75. Devices 78 and 98 may be considered as the means responsive to at least the reset signal for developing a control potential to actuate a resetting driver.

Anode 97 is connected with the control electrode of an electron-discharge device 103 through a resistor 104. Device 103 further includes an anode 105 and a cathode 106. Control electrode 102 is connected through a resistor 107 to the junction of resistors 107' and 108' which form a voltage divider between bus 84 and ground 75. Control grid 102 is by-passed to ground by a condenser 108 and cathode 106 is returned to ground through a resistor 109. The anode of device 103 is connected to the B-supply bus 84 through the energizing coil of an electromagnet 110. Device 103 and electromagnet 110 may be considered as a relay for actuating a resetting driver for integrator 46 as will be pointed out more fully hereinafter.

B supply bus 84 is connected to the positive terminal of a source of B supply 111 through the normally open contacts 112 and 113 of a relay 114. The negative terminal of source 111 is connected to ground 75. Relay 114 includes an energizing coil 115 connected in parallel with warning indicator light 69 and thereby when switch 55 is actuated the contacts 112 and 113 of relay 114 are closed by the energization of coil 115 and B power is supplied to the B supply bus 84.

In the vicinity of integrator 46, a rod 116 is supported for longitudinal movement within a member 117. A longitudinal continuation of rod 116 includes, on one surface, a toothed rack 118 which is mechanically coupled with gear 49 through a gear 119. Rack 118 may be directly meshed with gear 49, however, for the sake of clarity of illustration the intermediate gear 119 is shown and gear 49 is indicated as being a spiral gear. By this expedient, the rack 118 is movable in a plane which intersects the plane of gear 49. A spring 120 extends between member 117 and the junction of rod 116 and its toothed continuation 118 to bias the rack in a right hand direction, looking at the plane of the sheet of the drawing. When integrator 46 is driven in an additive direction the rack is arranged to be displaced in a direction opposed to the bias of spring 120. It follows then that spring 120 constitutes a resetting driver coupled with integrator 46 adapted to drive the integrator in a subtractive direction. A stop abutment 121 of resilient material is disposed on rod 116 at the position from which the continuation for rack 118 extends. Movement of the rack and rod is limited by stop 121 engaging member 117 when driven by the resetting driver or spring 120. The arrangement is such that the resetting driver drives the rack 118 and integrator 46 in a substractive direction for a preselected time value in response to a control potential.

Another surface of the continuation of rod 116, opposite rack 118, includes another toothed or serrated surface 122 which is adapted to be engaged by a pawl 123, which together constitute a ratchet, so that when surface 122 is displaced in opposition to the bias of spring 120 the pawl maintains rod 116 in any displaced position, against the bias of the spring 120. Pawl 123 is supported, near the extremity thereof opposite the rack engaging portion, for pivotal movement about pivot 124. The pawl 123 carries an extension 125 and a toggle spring 126 is attached to extension 125 in such a manner that pawl 123 normally is biased in a direction counterclockwise relative to the plane of the drawing and into engagement with toothed surface 122. Extension 125 carries a piece of magnetic material 127 in the vicinity of electromagnet 110 positioned so that when the electromagnet is energized the magnetic material is attracted thereto. As a result pawl 123 is pivoted about point 124 in a direction clockwise relative to the plane of the figure, carrying pawl 123 from engagement with surface 122, and toggle spring 126 is carried through its over-center position whereby extension 125 is biased against electromagnet 110. In this operative condition, pawl 123 is sustained in the dash position shown, by the bias of spring 126.

Rod 116 carries a second motion limiting stop 128 disposed at the end opposite the continuation carrying racks 118 and 122. The length of rod 116 is adjusted so that when integrator 46 reaches the limit of counting, in this example 50 time units, stop 128 engages member 117 and movement of rod 116 is arrested thereby arresting movement of rack 118, gear 119, gear 49, wheels 47 and 48 and slipping occurs between idler wheel 39 and disc 38. Concurrently as stop 128 engages member 117, the extremity of rod continuation 118 is in the position shown by a dash line and engages the movable contact 129 of a normally closed switch having a fixed contact 129'. This switch is connected in series circuit with pickup head 30 and decoding signal filter and stage 34.

At the extremity of pawl 123 opposite the rack-engaging portion and pivot 124, a bracket 130 extends in a direction parallel to the axis of the pivot. Cooperatively disposed with respect to bracket 130, a deflectable finger 131 is pivoted at the side of the continuation of rod 116 having racks 118 and 122. Finger 131 is biased against a stop 132 by a spring 133 and is arranged to engage and displace bracket 130 when pawl 123 is in the dash position and rod 116 is displaced in the direction of the bias of spring 120 thereby returning the pawl into engagement with rack 122.

A manually operable control knob 134 having a calibration scale 135 is mechanically coupled through a suitable linkage 136 to carriages 41 and 32. The linkage is suitably arranged so that when knob 134 is positioned, in accordance with a particular programming rate of charge, carriage 32 is positioned to properly displace head 30 from recording head 23 in order that the proper time delay be interposed on the decoding signal. Simultaneously carriage 41 is displaced to the position whereby the rate at which idler wheel 39 rotates is proportional to the particular programming rate of charge.

Assume now that the receiver is conditioned to translate a coded television signal as described above. Switch 29 is closed and power is supplied to motor 26 thereby providing rotation of disc or element 24 through shaft 25. By means of selector knob 34 the position of pickup head 30 is adjusted relative to that of recording head 23 along the periphery of disc 24 to that position wherein the decoding signal of decoding signal generator 22 is delayed by the proper time interval and supplied to stage 34. With this manual adjustment, idler wheel 39 is so positioned on the surface of disc 38 that the speed with which shaft 40 rotates is dependent upon the programming rate of charge and hence the speed with which time unit intervals are intergrated by integrator 46 is related to the programming rate. Each time units wheel 47 of integrator 46 completes one revolution, tens wheel 48 is advanced one digit. As the reading of integrator 46 increases rod 116, 118 is driven to the left, looking at the plane of the drawing, in response to movement of tens wheel 48, and is maintained in position by means of pawl 123 engaging the toothed surface 122. When the reading of integrator 46 reaches 40 units, actuating surface 52 of cam 50 engages and displaces cam follower 56 to pivot lever 57 in a direction opposed to the bias applied by spring 59. This movement, being transferred through arm 60, closes contacts 61 and 62 and contacts 63 and 64. The closing of contacts 61 and 62 completes the circuit between battery 70 and warning light 69 and energizes relay coil 115 of relay 114 to close contacts 112, 113 of the relay and apply B power from source 111 to vacuum tubes 78 and 105. The closing of contacts 63 and 64 completes a circuit from pickup head 54 to amplifier 65 and the subscriber identification signal recorded on disc 53 is supplied through amplifier 65 and limiter 66 to the line to the telephone exchange through the induction coil 67 and telephone unit 68.

The subscriber identification signal is also applied to control grid 81 of electron tube 78 which tube has been adjusted as an amplifier by means of bias controls 90 and 91 so that the subscriber identification signal appears in the anode circuit at resistor 96. This signal is applied to diode 98 and a negative unidirectional voltage, relative to ground is developed across resistor 107. Electron tube 103 which is normally in a conductive condition, by reason of the forced positive bias from divider 107', 108' at control grid 102 is supplied with this negative voltage at grid 102. The magnitude of the negative voltage is sufficient to render the tube 103 nonconductive, countering the forced bias. Therefore, it may be seen that at the instant anode supply voltage from source 111 is applied to stage 103 a negative voltage, relative to ground 75, is applied to control grid 102 as a result of the signal from the subscriber identification signal generator.

The subscriber in noting that the decade counter of integrator 46 has reached 40 units (or his attention to this occurrence may be called by warning light 69) completes a telephone call to the central or transmitting station (not shown) usually by means of the telephone unit 68. At the transmitting station not only is communication with the subscriber carried on but the subscriber identification signal also is received. This signal, through suitable means, (not shown) is observed to identify the subscriber and check his credit status. These steps being completed, a recording of the subscriber identification signal is made and a reset signal either in identical or in opposite phase to the subscriber signal is transmitted on a carrier from the transmitting station to the subscriber.

The incoming carrier or reset signal, transmitted from the central station in response to the subscriber identification signal, is selected by resonant circuit 71 and the intelligence modulation is removed therefrom by detector 72. The resulting reset signal is amplified in stage 73, amplitude limited in stage 74 and applied to control grid 77 of vacuum tube 78 with a polarity opposite to that with which the subscriber identification signal is applied to control grid 81. Since limiters 66 and 74 are utilized to amplitude limit both the subscriber identification and the reset signals the timing relations of the two signals applied at grids 81, 77 may be compared by tube 78. If the signals are of the same character, relative to duration and repetition interval, they cancel one another in tube 78 and the alternating voltage which ordinarily is applied to anode 97 of diode 98 is removed. This removes the negative voltage component, supplied by stage 78, from grid 102, vacuum tube 103 becomes conductive and current flows through the energizing coil of electromagnet 110.

With current flowing through the coil of electromagnet 110 a magnetic field is set up which attracts magnetic element 127 to carry the extension 125 and pawl 123 in a direction clockwise about point 124 relative to the plane of the sheet of the drawing. Toggle spring 126, which is carried through its over-center position now maintains pawl 122 in a position abutting electromagnet 110. As pawl 123 is freed from toothed surface 122, the bias of spring 120 carries rod 116 in a direction to the right with reference to the plane of the drawing, until stop abutment 121 engages member 117. The length of toothed rack 118 and the diameter of gear 49 are such that when rod 116, 118 travels through the just-described sweep, tens wheel 48 is driven in a subtractive direction for a preselected time value. The time value in this example is 40 units and is effected in response to the control potential developed in the comparing circuit including vacuum tube 78.

As continuation 118 of rod 116 travels in a restoring direction deflectable finger 131 engages bracket 130 of pawl 123 to impose rotation of the pawl reverse to that imparted by the field of electromagnet 110. Hence, pawl 123 is placed in engagement with toothed surface 122.

Should the receiver be operated beyond 40 time units, and no resetting signal is applied, rod 116 is carried to a stop position in which abutment 128 engages member 117. In this (dash) position of the rod the extremity of portion 118 opposite stop 121 engages the movable contact 129 to open switch 129, 129'. The opening of this switch breaks the circuit between pickup head 30 and stage 34 of the receiver and a decoding signal is no longer available for properly altering the timing of the coded television signal. Consequently, the representation of reproducing device 14 is no longer intelligible and the receiver is rendered substantially inoperative for subscription programs. However, should a call be completed to the central station by the subscriber, the afore-described sequence of operation restores the system, by subtracting 40 time units, to an operative condition.

It is contemplated that the entire workings of the metering system 35 be contained inside a sealed box within or adjacent to the subscriber receiver. Of course, warning light 69 and the counter wheels 47 and 48 of integrator 46 should be visible for observation by the subscriber.

The invention provides, therefore, in a subscription type receiver, a metering system which obviates the need for a meter reader making personal visits to the locale of the subscriber receiver. Subscriber charges are effected via a line circuit over which a reset signal is transmitted from a central station in response to a subscriber identification signal. In the absence of a subscriber identification signal no reset signal is transmitted, thereby materially obviating improper resetting operations. In other words, resetting may not be accomplished unless the decade counter at the subscriber receiver indicates at least 40 time units.

While a particular embodiment of the present invention has been shown and described, it will be obvious to those skilled in the art that changes and modifications may be made without departing from this invention in its broader aspects, and therefore, the aim in the appended claims is to cover all such changes and modifications as fall within the true spirit and scope of this invention.

We claim:

1. In a subscriber type television receiver including an element operable during the reception of subscription programs, a subscription-program metering system for effecting subscriber charges via a line circuit over which a reset signal is transmitted from a central station in response to a subscriber-identification signal comprising: an integrator coupled to said receiver element and driven in an additive direction thereby, to integrate the time intervals during which said element is operated; a generator for producing a subscriber identification signal; a switch actuated by said integrator for selectively coupling said generator with said line circuit to establish on said line transmission of said identification signal at a predetermined time summation of said integrator; a resetting driver coupled with said integrator to drive said integrator in a subtractive direction for a preselected time value in response to a control potential; and means responsive to at least said reset signal for developing a control potential for actuating said resetting driver.

2. In a subscriber type television receiver including an element operable during the reception of subscription programs, a subscription-program metering system for effecting subscriber charges via a line circuit over which a reset signal is transmitted from a central station in response to a subscriber identification signal comprising: an integrator of the decade counter type coupled to said receiver element and driven in an additive direction thereby, to integrate the time intervals during which said element is operated; a generator for producing a subscriber identification signal; a switch actuated by said integrator for selectively coupling said generator with said line circuit to establish on said line transmission of said identification signal at a predetermined time summation of said integrator; a resetting driver coupled with said integrator to drive said integrator in a subtractive direction for a preselected time value in response to a control potential; and means responsive to at least said reset signal for developing a control potential for actuating said resetting driver.

3. In a subscriber type television receiver including an element operable during the reception of subscription programs, a subscription-program metering system for effecting subscriber charges via a line circuit over which a reset signal is transmitted from a central station in response to a subscriber identification signal comprising: an integrator of the decade counter type including a plurality of movable decade-stepped indicator elements coupled to said receiver element and driven in an additive direction thereby, to integrate the time intervals during which said element is operated; a cam supported for movement with one of said indicator elements and including a cam-follower actuating surface disposed at a preselected position relative to said indicator element corresponding to a predetermined time summation of said integrator; a generator for producing a subscriber identification signal; a switch including a cam follower supported for engagement with said actuating surface of said cam to be actuated thereby for selectively coupling said generator with said line circuit to establish on said line transmission of said identification signal at said predetermined time summation of said integrator; a resetting driver coupled with said integrator to drive said integrator in a subtractive direction for a preselected time value in response to a control potential; and means responsive to at least said reset signal for developing a control potential for actuating said resetting driver.

4. In a subscriber type television receiver including an element operable during the reception of subscription programs, a subscription-program metering system for effecting subscriber charges via a line circuit over which a reset signal is transmitted from a central station in response to a subscriber identification signal comprising: an integrator coupled to said receiver element and driven in an additive direction thereby, to integrate the time intervals during which said element is operated; a generator for producing a subscriber identification signal; a switch actuated by said integrator for selectively coupling said generator with said line circuit to establish on said line transmission of said identification signal at a predetermined time summation of said integrator; a resetting driver coupled with said integrator to drive said integrator in a subtractive direction for a preselected time value in response to a control potential; and means responsive jointly to said identification signal and to said reset signal for developing a control potential for actuating said resetting driver.

5. In a subscriber type television receiver including an element operable during the reception of subscription programs, a subscription-program metering system for effecting subscriber charges via a line circuit over which a reset signal is transmitted from a central station in response to a subscriber identification signal comprising: an integrator coupled to said receiver element and driven in an additive direction thereby, to integrate the time intervals during which said element is operated; a generator for producing a subscriber identification signal; a switch actuated by said integrator for selectively coupling said generator with said line circuit to establish on said line transmission of said identification signal at a predetermined time summation of said integrator; a resetting driver coupled with said integrator to drive said integrator in a subtractive direction for a preselected time value in response to a control potential; and a comparing circuit coupled to said identification signal generator and to said line circuit for comparing said identification signal with said reset signal to develop a control potential for actuating said resetting driver.

6. In a subscriber type television receiver including an element operable during the reception of subscription programs, a subscription-program metering system for effecting subscriber charges via a line circuit over which a reset signal is transmitted from a central station in response to a subscriber identification signal comprising: an integrator coupled to said receiver element and driven in an additive direction thereby, to integrate the time intervals during which said element is operated; a generator for producing a subscriber identification signal; a switch actuated by said integrator for selectively coupling said generator with said line circuit to establish on said line transmission of said identification signal at a predetermined time summation of said integrator; a resetting driver coupled with said integrator to drive said integrator in a subtractive direction for a preselected time value in response to a control potential; and a comparing circuit coupled to said identification signal generator and to said line circuit for comparing said identification signal with said reset signal to develop a control potential for actuating said resetting driver in the presence of signals having a predetermined timing relation relative to one another.

7. In a subscriber type television receiver including an element operable during the reception of subscription programs, a subscription-program metering system for effecting subscriber charges via a line circuit over which a reset signal is transmitted from a central station in response to a subscriber identification signal comprising: an integrator coupled to said receiver element and driven in an additive direction thereby, to integrate the time intervals during which said element is operated; a generator for producing a subscriber identification signal; a switch actuated by said integrator for selectively coupling said generator with said line circuit to establish on said line transmission of said identification signal at a predetermined time summation of said integrator; a resetting driver coupled with said integrator to drive said integrator in a subtractive direction for a preselected time value; a relay for actuating said resetting driver; and means responsive to at least said reset signal for developing a control potential for actuating said relay.

BERTRAND J. MILLER.
GEORGE V. MORRIS.

REFERENCES CITED

The following references are of record in the file of this patent:

UNITED STATES PATENTS

| Number | Name | Date |
|---|---|---|
| 1,919,992 | Stewart | July 25, 1933 |
| 2,254,378 | Mallina | Sept. 2, 1941 |
| 2,306,654 | Tuman | Dec. 29, 1942 |
| 2,370,736 | Kittredge | Mar. 6, 1945 |
| 2,393,374 | Herrick | Jan. 22, 1946 |
| 2,403,059 | Dillenback | July 2, 1946 |

OTHER REFERENCES

"Phonevision," by "Roschke," paper presented November 1, 1948, pages 1–16. (Copy in Division 16.)